United States Patent
Cardi

(10) Patent No.: US 11,559,010 B2
(45) Date of Patent: Jan. 24, 2023

(54) DEVICE FOR SEEDING A CLOUD CELL

(71) Applicant: SELERYS, Rousset (FR)

(72) Inventor: Philippe Cardi, Greasque (FR)

(73) Assignee: SELERYS, Rousset (FR)

( * ) Notice: Subject to any disclaimer, the term of this patent is extended or adjusted under 35 U.S.C. 154(b) by 922 days.

(21) Appl. No.: 16/300,353

(22) PCT Filed: May 2, 2017

(86) PCT No.: PCT/FR2017/051045
§ 371 (c)(1),
(2) Date: Jan. 15, 2020

(87) PCT Pub. No.: WO2017/194856
PCT Pub. Date: Nov. 16, 2017

(65) Prior Publication Data
US 2020/0178481 A1 Jun. 11, 2020

(30) Foreign Application Priority Data

May 10, 2016 (FR) ....................... 1654155

(51) Int. Cl.
*A01G 15/00* (2006.01)
*B64B 1/40* (2006.01)
*B64B 1/46* (2006.01)

(52) U.S. Cl.
CPC ................ *A01G 15/00* (2013.01); *B64B 1/40* (2013.01); *B64B 1/46* (2013.01)

(58) Field of Classification Search
CPC ............ A01G 15/00; B64D 1/16; B64B 1/46; B64B 1/48; B64B 1/44
See application file for complete search history.

(56) References Cited

U.S. PATENT DOCUMENTS

| | | | |
|---|---|---|---|
| 230,067 A | 7/1880 | Ruggles et al. | |
| 1,103,490 A | 7/1914 | Cordray | |
| 5,360,162 A * | 11/1994 | Mentus | A01G 15/00 239/2.1 |

(Continued)

FOREIGN PATENT DOCUMENTS

| CN | 201467770 U | 5/2010 |
|---|---|---|
| CN | 105607153 A | 5/2016 |

(Continued)

OTHER PUBLICATIONS

European Notice of Intention to Grant dated Dec. 9, 2020 issued by the European Patent Office in corresponding European Patent Application No. 17725706.0 (6 pages).

(Continued)

*Primary Examiner* — Tien Q Dinh
*Assistant Examiner* — William L Gmoser
(74) *Attorney, Agent, or Firm* — Buchanan Ingersoll & Rooney PC

(57) ABSTRACT

The invention concerns a device for seeding a cloud cell, comprising means for conveying an active substance and means for delivering said active substance. In order to comply with standard and safety requirements, said device comprises aerostatic means that cooperate with the means for conveying said active substance. The invention further concerns a system for seeding a cloud cell, comprising a seeding device according to the invention and a remote electronic entity capable of communicating with said device via communication means over a wired or wireless link.

16 Claims, 3 Drawing Sheets

(56) References Cited

U.S. PATENT DOCUMENTS

Figure 4A:
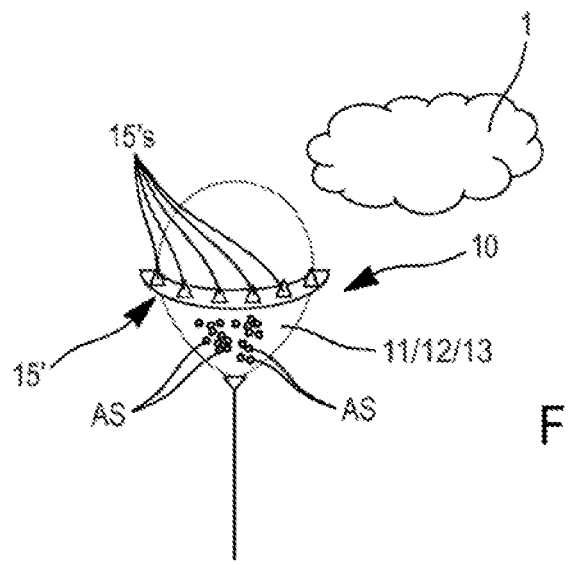

| | | | |
|---|---|---|---|
| 6,234,425 B1* | 5/2001 | Rand | B64B 1/46 |
| | | | 244/137.4 |
| 9,296,462 B1* | 3/2016 | Brookes | B64B 1/58 |
| 9,327,816 B1* | 5/2016 | Mathe | B64B 1/44 |
| 2012/0241554 A1 | 9/2012 | Davidson et al. | |
| 2015/0359184 A1 | 12/2015 | Goelet | |
| 2016/0288894 A1* | 10/2016 | Sehnert | B64B 1/30 |
| 2016/0370263 A1* | 12/2016 | Duesterhoft | B64D 1/02 |
| 2017/0055463 A1 | 3/2017 | Caldeira et al. | |
| 2017/0057607 A1* | 3/2017 | Knoblach | H04B 7/18502 |

FOREIGN PATENT DOCUMENTS

| | | | | |
|---|---|---|---|---|
| GB | 191409580 A | * | 7/1915 | A01G 15/00 |
| GB | 2476518 A | | 6/2011 | |
| JP | 2005013017 A | | 1/2005 | |
| WO | 2014082036 A1 | | 5/2014 | |
| WO | 2015191812 A2 | | 12/2015 | |

OTHER PUBLICATIONS

Eunsil Jung et al., "Use of Radar Chaff for Studying Circulations in and around Shallow Cumulus Clouds", Journal of Applied Meteorology and Climatology, vol. 53, No. 8, Aug. 1, 2014, pp. 2058-2071.

International Search Report (PCT/ISA/210) dated Aug. 18, 2017, by the European Patent Office as the International Searching Authority for International Application No. PCT/FR2017/051045.

Written Opinion (PCT/ISA/237) dated Aug. 18, 2017, by the European Patent Office as the International Searching Authority for International Application No. PCT/FR2017/051045.

* cited by examiner

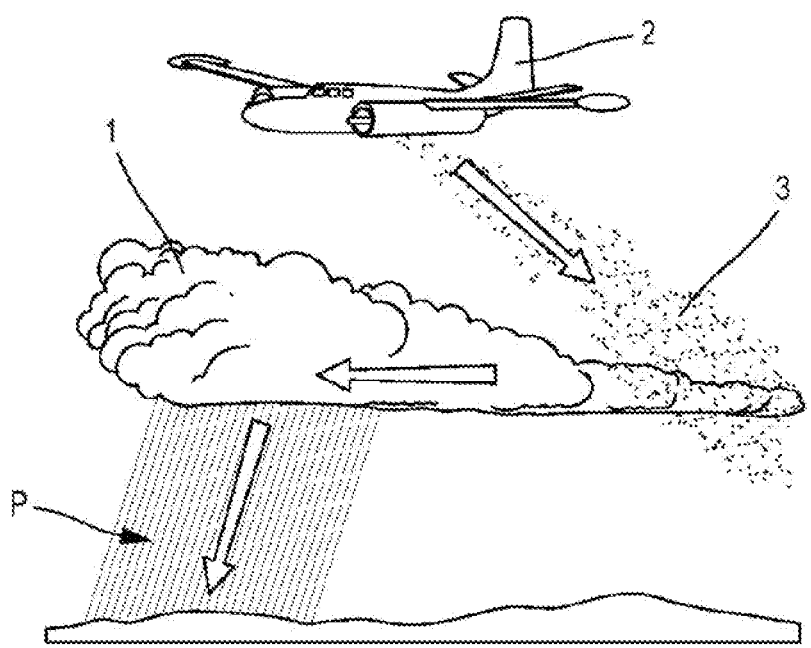
FIG.1
(prior art)
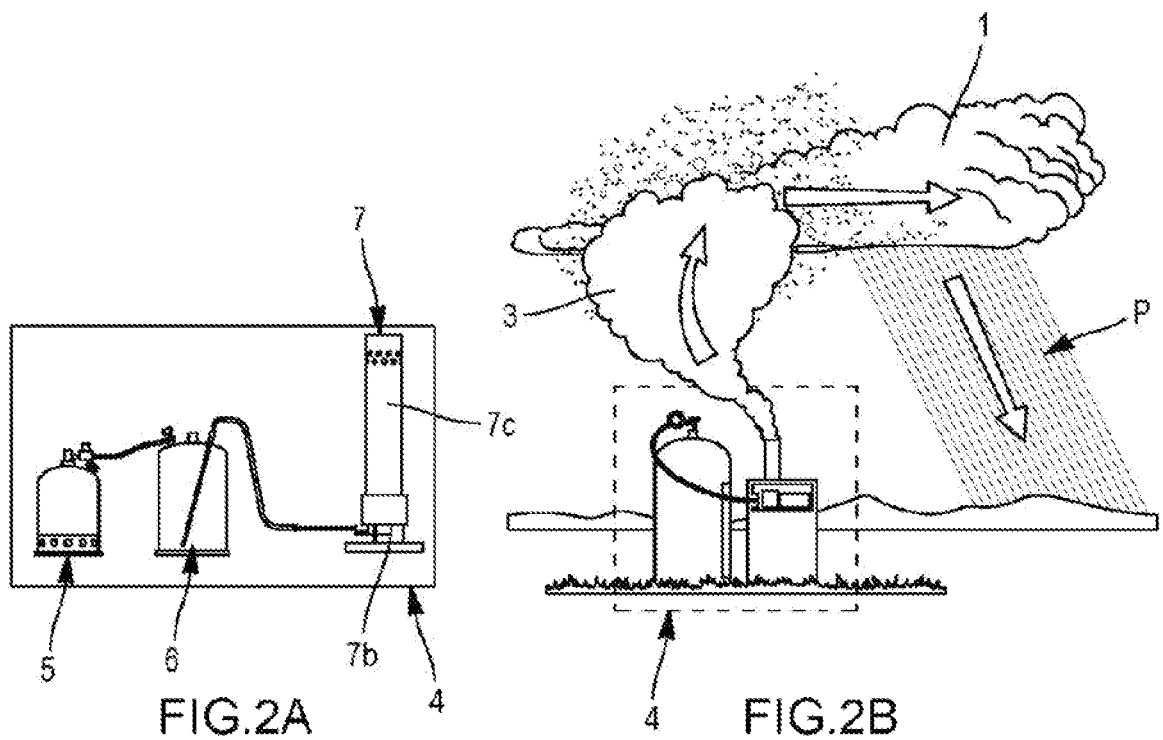
FIG.2A
(prior art)
FIG.2B
(prior art)

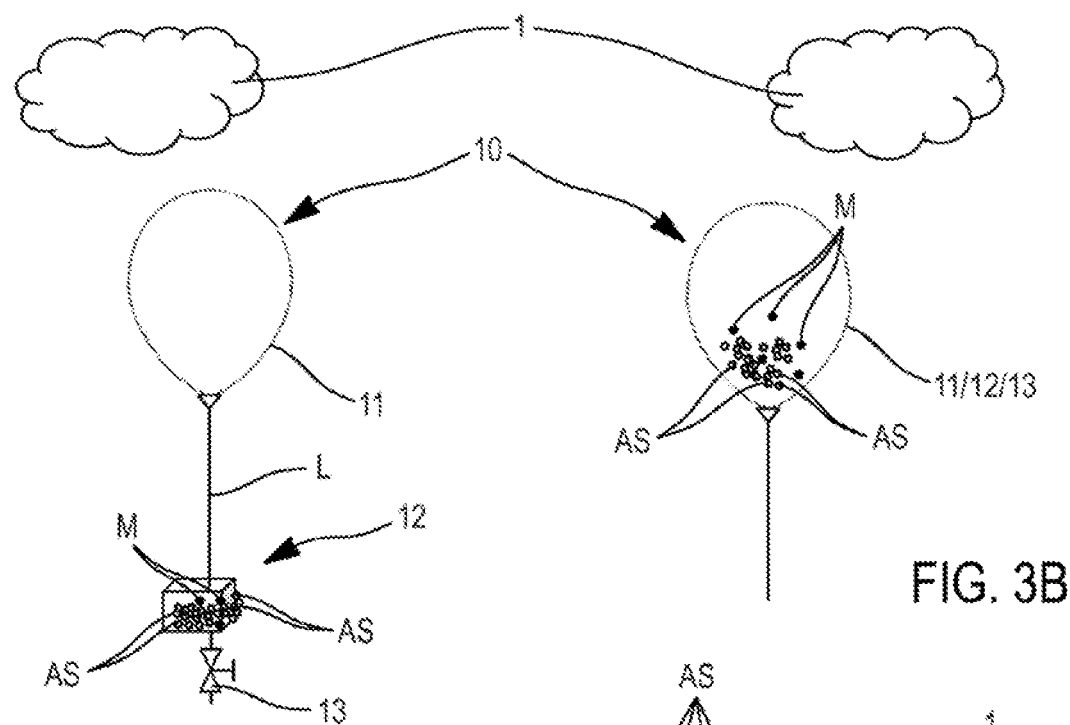
FIG. 3A
FIG. 3B
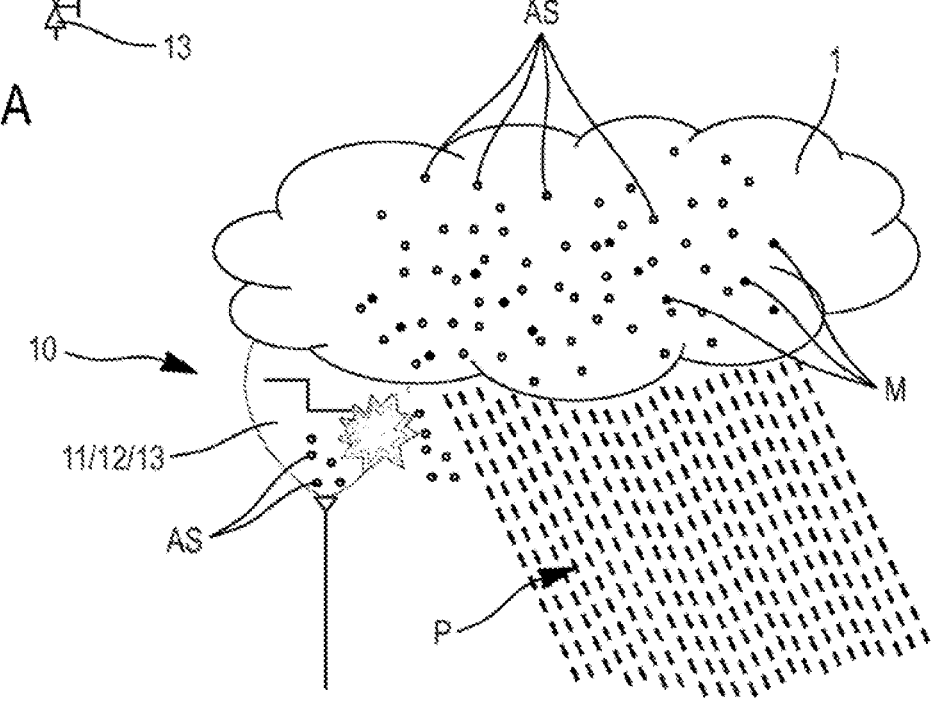
FIG. 3C

DEVICE FOR SEEDING A CLOUD CELL

The invention relates to the field of devices applied with the prevention and/or perturbation of meteorological and microphysical equilibria. Such devices are used for all types of uses and preferably but not in a limiting manner in order to ensure cloud cell seeding functions (also known under the English term "cloud seeding").

In the rest of the document, the invention will be described preferably but in a non-limiting manner in the context of hail prevention.

Currently, global warming or more generally climate changes are at the focus of numerous debates. Such climate changes relate in particular but not in a limiting manner to the agricultural field, which suffers particularly from unexpected meteorological changes. In some territories such as Africa or Asia, water resources have decreased considerably in recent years. In addition, water supply difficulties have worsened the situation. Moreover, in other territories such as in Europe, for example, operators such as certain farmers suffer from unexpected hail falling on their operations, such precipitation potentially causing considerable damage to future harvests. The same applies to snow which sometimes reappears unexpectedly in spring, destroying all or part of the growing crops, whereas the temperatures seemed to be more favorable for agriculture.

Most meteorological phenomena, such as rain, hail or snow as non-limiting examples, are due to phenomena of supercooling of water within cloud cells or more generally of the atmosphere. At the start, a cloud cell consists essentially of droplets of liquid water suspended in the atmosphere. Here, the sun, due to its irradiation, vaporizes the liquid water resources. The hot air thus formed and present in the atmosphere consequently contains water vapor which, due to its low density, rises in altitude. In the process, the pressure decreases, and the previously formed hot air cools so as to gradually condense into fine droplets around fine particles present in the atmosphere and agglomerate. In this way a cloud cell forms. Depending on the regions in which a cloud cell moves, the cloud cell can then become the precursor of rain, snow or hail formation. When a cloud cell reaches a zone or region in which the temperature is between 0 and −35° C. (negative temperatures), zone where ice crystals form from ice nuclei (also known under the term of freezing nuclei), the supercooled water droplets present within the cloud cell are close to said ice crystals. The water droplets then migrate towards the ice crystals, enabling said crystals to grow in size until they become snowflakes within the cloud cell. Depending on the outside temperature on the ground, such snowflakes, when they precipitate, are transformed into rain, in summer, for example, or remain in the snow state, in winter, for example. The formation of the hail then originates from the process of growth of ice crystals in the presence of ascending currents or hot air currents which are strong enough to maintain the crystals in suspension in the cloud cell. Such cloud cells are called "cumulonimbus." Thus, in the presence of ascending currents, the supercooled water droplets are pushed towards the higher and consequently colder region of the cloud cell where the ice crystals are found, mixing with said crystals and forming hailstones. Such hailstones in turn are carried along by the ascending currents, and other ice crystals then agglomerate to the hailstones and then enable the growth in size of the hailstones up to a size which no longer allows the hailstones to remain contained within the cloud cell. The hailstones are then precipitated towards the ground.

In view of the considerable damage that rain, snow or hail can cause, various researchers have tried to find methods or processes intended to perturb the microphysical equilibria in order to change the processes of formation of precipitation and thus modify the climate: these are seeding methods. As non-limiting examples, such methods make it possible to increase the condensation of water vapor into liquid water which is available in a cloud cell and thus to increase or decrease the size and the number of the droplets present within said cloud cell. In the end, such methods can cause precipitation or, as a variant, hail fall. To achieve this, particles, optionally artificial, or active substances, also known under the name of "artificial freezing nuclei," are introduced within a cloud cell in order to alter, perturb and even modify the exchanges between the different states of water, for example, by accelerating the growth of certain droplets or the solidification of said droplets to form ice crystals. In the entire document, the expressions "agent," "particles" or "active substance" will be used interchangeably to define the elements responsible for the seeding. Said particles or active substances preferably have a strong affinity for water. In addition, depending on the type of action or altitude desired, possibly depending on local conditions, different types of active substance(s) can be used. In general, for cold zones such as, for example, zones located at above three thousand meters, such particles can advantageously but in a non-limiting manner consist of ice nuclei such as silver iodide or copper iodide. The use of silver iodide is particularly advantageous and consequently preferred, since it is the most effective particle at −5° C. in small quantities. As a variant or additionally, other researchers recommend, depending on the applications, for example, for so-called hot zones, hygroscopic salts in the form of, for example, sodium, calcium or magnesium salts, alginates. As a variant, such particles can also consist of cooling materials such as dry ice, which acts at about −35° C., thus enabling the crystallization of supercooled water and thus producing an effect similar or identical to silver iodide. Moreover, as a variant or additionally, such cooling materials can be propane or liquid nitrogen. Preferably but in a non-limiting manner, such particles are generally scatter by means of aerosols. The presence of ascending currents within the cloud cell can greatly increase the effectiveness of the particles or agents for the seeding. In fact, the ascending currents carry along and suck in the particles, so that the particles are dispersed within the cloud cell, reach the supercooled water and encounter ice crystals or hailstones.

In order to ensure the scattering of such particles regardless of their composition, different techniques and systems can be used. FIGS. 1, 2A and 2B present respectively first and second embodiments of known devices for seeding a cloud cell.

First, the seeding of a cloud cell can be carried out aerially, for example, by means of aircraft. This first embodiment is described in connection with FIG. 1. An aircraft advantageously consists of an airplane 2 suitable for seeding a cloud cell 1. Devices for seeding a cloud cell 1 in the form of scattering devices (not represented in FIG. 1) of particles 3 can advantageously equip such an aircraft and, for example, be positioned on the wings when the aircraft is the airplane 2. The pilot (not represented in FIG. 1) of such an aircraft then delivers particles at the base of a cloud cell 1 or on the flank of said cloud cell 1. To achieve this, such seeding requires the employment of seasoned, experienced pilots, given the considerable turbulence that they have to confront. In addition, in order to simultaneously treat several cloud cells, several aircraft have to be available and consequently several pilots. Moreover, such aircraft cannot circulate freely: they must comply with and respect applicable air traffic rules depending on the territories flown over by said aircraft. Moreover, such operations entail technical constraints and consequently the need for particular expertise, as well as high financial costs which, in some situations, can negatively impact the proper running of the operations. Finally, the control of the scattering of the particles is not always adequate when the aircraft is in flight, since the meteorological conditions can be additional factors of difficulty during the delivery of the particles.

In order to attempt to reduce the costs of such seeding, devices designed for cloud cell seeding have also been developed, which are in the form of rockets of the "anti-hail" type in the context of hail prevention. Such rockets can optionally be launched from the earth's surface. As a variant, such rockets can advantageously be installed on aircraft as described in connection with FIG. 1, advantageously on or under the wings of the airplane 2, for example. During the flight of the aircraft, said rockets are then fired into one or more cloud cells. The effectiveness of said rockets can also depend on the presence of ascending currents which can impact, this time negatively, the propagation of the particles within the cloud cell. However, the use of one or more pyrotechnic rockets for seeding a cloud cell presents numerous disadvantages. On the one hand, several risk factors are associated with the use of explosive devices, requiring the application of pyrotechnic standards in numerous situations. In addition, when the uses are connected with the use of aircraft or possibly when the rockets are launched in territories in which there is air traffic, it is also necessary to make sure that the applicable air traffic rules are complied with. In addition to the problems associated with standards and safety, the firing of rockets does not always ensure adequate propagation of the particles, and, in the end, the effectiveness of said rockets is reduced as a result. In fact, it is very often difficult to control the trajectory of a rocket once the rocket has been launched.

Optionally, as a variant, aircraft can be equipped with poles and flares with hygroscopic salts (not represented in FIG. 1). Like rockets, such flares are associated with the same classes of disadvantages, in particular regarding safety standards.

Faced with the disadvantages presented by the devices for seeding a cloud cell in connection with aircraft as described in connection with FIG. 1, other researchers recommend the use of ground-based devices. Such ground-based devices for seeding a cloud cell are referred to as ground burners or also known under the terms of "vortex generators" or "ice particle generators." Such ground-based devices consist of a second embodiment of a known device for seeding a cloud cell and are described in connection with FIGS. 2A and 2B. According to FIGS. 2A and 2B, such a ground-based device or vortex generator 4, adapted especially for seeding a cloud cell 1, comprises a compressed air bottle 5, a reservoir 6 comprising a solution containing acetone and silver iodide, said reservoir 6 being in fluidic communication with the compressed air bottle 5 by means of one or more ducts and valves suitable for controlling the pressure of the compressed air within said ducts. The ground-based device 4 moreover comprises a combustion chamber 7 including a cylindrical chimney 7*c* at the base of which a burner 7*b* is positioned. The combustion chamber 7 moreover cooperates with the reservoir 6 of solution of acetone and silver iodide. The operating principle of such a ground-based device 4 is the following: the solution of acetone and silver iodide is pressurized by means of the compressed air contained in the bottle 5 and by means of a pressure reducing device within the reservoir 6. Subsequently, said solution of acetone and silver iodide is vaporized, and then sprayed within the combustion chamber 7 by means of a sprinkler (not represented in FIGS. 2A and 2B), and then ignited by the burner 7*b* so as to rise in the atmosphere and then enable the seeding of the cloud cell 1.

However, these ground-based devices, such as the one described in connection with FIGS. 2A and 2B, also have a certain number of disadvantages. First, such a device being positioned on the ground, the scattering of the particles such as silver iodide for seeding a cloud cell can be subjected to certain constraints, due in particular to the presence of numerous obstacles present on the surface of the earth such as, for example, trees or buildings, which thus alter or prevent the scattering of the particles within the cloud cells. Moreover, such a scattering of particles is very often imprecise, since the ground-based devices are generally positioned stationarily at a relatively large distance from the cloud cells to be seeded, on the order of several hundred or several thousand meters. The presence of air currents or winds can then deflect the trajectory of the particles, compromise the proper operation of the seeding and consequently result in contamination of the environments located in the vicinity of said ground-based devices. Moreover, due to its presence on the ground and due to its overall dimensions, it is very often impossible to move a ground-based device quickly, whereas the cloud cells may be moving. Finally, the operating process imposed by the use of a ground-based device also includes a certain number of disadvantages. Currently, within the ground-based devices, there is no means for tracking the trajectory and/or the scattering of the particles in order to verify whether, in a non-limiting manner, said particles have risen in the atmosphere or whether they have dispersed correctly within the cloud cells to be seeded.

Alternatively, for the prevention of hail, other known ground-based devices can consist of shock wave cannons (not represented in the figures), also known under the term of "anti-hail cannons." One or more sound waves are emitted by the cannon and directed towards the cloud cell(s) to be treated. The shock wave then crystallizes the supercooled water and generates a vortex at the outlet of the cannon, thus enabling the ionization of the air at an altitude of about one hundred meters. Like the above-described ground-based devices, such anti-hail cannons do not contribute relevant solutions for remedying the disadvantages associated with the other devices for seeding a cloud cell, such as those described above in connection with FIGS. 1, 2A and 2B. Furthermore, few technical and scientific studies have been conducted in order to determine the relevance and even the effectiveness of such seeding methods.

The invention makes it possible to address all or some of the disadvantages raised by the known solutions.

Among the numerous advantages contributed by a device for seeding a cloud cell according to the invention, we can mention that said device makes it possible to:

- offer a more precise seeding process by the use of a device conveying an active substance whose trajectory and/or dispersion can be controlled;
- propose a simple, modular and rapid device which is adaptable to a multitude of applications;
- guarantee a targeted action and avoid any contamination of the nearby environment;
- address the regulatory problems and safety constraints imposed as of now by the currently used solutions.

For this purpose, a device is provided in particular for seeding a cloud cell, comprising means for conveying an active substance and means for delivering said active substance, said device moreover comprising aerostatic means including a balloon and cooperating with the means for conveying said active substance. In order to reduce and even eliminate any regulatory and/or safety problems and in order to ensure a controlled seeding, said device for seeding a cloud cell is arranged in such a manner that the rupture of said balloon is brought about when said balloon substantially reaches a predetermined altitude.

As a variant, in order to facilitate the production of a device according to the invention, the means for conveying and the means for delivering of said device can consist of one and the same physical entity.

As a variant, for simplification purposes, the means for conveying and/or the means for delivering of a device according to the invention can be included within the aerostatic means.

Advantageously, the means for delivering and the aerostatic means of a device according to the invention can consist of one and the same physical entity.

In order to propose an all-in-one device, the means for conveying of a device according to the invention can comprise an active substance.

Preferably but in a non-limiting manner, the active substance can consist primarily of silver iodide or hygroscopic salt.

As a variant or additionally, in order to enable the traceability of a device according to the invention, the means for conveying of said device can also comprise propagation marker particles which can be detected by any suitable analysis means.

In order to ensure control of the seeding of a cloud cell, the means for delivering of a device according to the invention can comprise or cooperate with triggering means arranged so as to cause the delivery of the active substance at a given position.

Advantageously, in order to accelerate the delivery of the active substance, the triggering means of a device according to the invention can comprise one or more protruding elements whose distal portion is in contact with the aerostatic means.

As a variant or additionally, in order to actuate the delivery of an active substance in an automatic and precise manner, the triggering means of a device according to the invention can comprise:
  a first processing unit;
  a first sensor cooperating with said first processing unit and delivering to said first processing unit a measurement of a first physical quantity which is representative of the pressure within the aerostatic means;
  said first processing unit being arranged for comparing the measurement of the first physical quantity with a predetermined threshold and, when said measurement reaches said threshold, for generating an actuation command intended for the means for delivering the active sub stance;
and the means for delivering can have electrical controls and are suitable for interpreting the commands generated by the triggering means.

As a variant or additionally, in order to ensure a better traceability of a device according to the invention, the latter can moreover comprise means for tracking the trajectory and/or position of said device, said tracking means cooperating with the aerostatic means and comprising:
  a second processing unit;
  a second sensor for measuring and collecting a second physical quantity regarding the trajectory and/or the position of the device, cooperating with said second processing unit;
  a data memory cooperating with said second processing unit in which said second processing unit records the second quantity measured and collected according to a given periodicity.

Advantageously, for simplification purposes, the first and second processing units can consist of one and the same physical entity.

When marker particles are present within a device according to the invention, the second sensor can be capable of detecting the propagation marker particles according to a suitable analysis means.

Preferably but in a non-limiting manner, in order to track the trajectory and/or the position of a device according to the invention, the second sensor can comprise an accelerometer and/or a gyroscope.

In order to enable traceability in real time of the trajectory of a device according to the invention, the means for tracking of the latter can moreover comprise communication means cooperating with the second processing unit, said communication means being arranged in order to transmit all or part of the content of the data memory to a remote electronic entity.

In order to control and/or correct the trajectory of a device according to the invention, said device can comprise trajectory correction means which cooperate with the aerostatic means.

According to a second subject matter, the invention also relates to a system for seeding a cloud cell. In order to offer a more precise seeding process by the use of a device conveying an active substance whose trajectory and/or dispersion can be controlled, a system according to the invention comprises a device for seeding according to the first subject matter of the invention and a remote electronic entity capable of communicating with said device via communication means by wire or wireless connection.

As a variant or additionally, when the electronic entity of a system according to the invention is temporarily or permanently incapable of communicating with a device according to the first subject matter of the invention, said electronic entity can be arranged to read the content of the memory of the tracking means of said device.

Additionally, in order to facilitate the use of a device for seeding a cloud cell according to the invention, a system according to the invention can moreover include a station for preparation and/or launching of said device.

Other features and advantages will become clearer upon reading the following description and examining the accompanying figures, among which:

FIGS. 1, 2A and 2B, described above, illustrate detailed views of known devices for seeding a cloud cell;

FIGS. 3A and 3B present respectively first and second embodiments of a device for seeding a cloud cell according to the invention;

FIG. 3C presents an embodiment of a device for seeding in its anti-hail application context;

FIGS. 4A and 4B illustrate respectively third and fourth embodiments of a device for seeding a cloud cell according to the invention.

FIGS. 3A and 3B, 4A and 4B are diagrammatic representations of different embodiments of a device for seeding a cloud cell according to the invention.

In the sense of the invention and in the entire document, "cloud cell" is understood to mean any cluster or mass of fine droplets of liquid water or vaporized water suspended in the atmosphere, said droplets being possibly maintained in suspension due to the presence of ascending currents. In fact, when the size of said droplets does not exceed a few microns, said droplets can be maintained in suspension naturally.

In order to carry out the seeding of such a cloud cell, that is to say in order to perturb the microphysical equilibria within the cell, particles or active substances, also known under the name of "artificial freezing nuclei" when the active substance acts in a cold zone, are introduced within said cloud cell in order to alter, perturb and even modify the exchanges between the different states of the water, for example by accelerating the growth of certain droplets or the solidification of said droplets to form ice crystals. As specified above, in the entire document, the expressions "active load," "artificial particles" or "active substance" will be used interchangeably in order to define an agent responsible for seeding a cloud cell.

Such a device 10 for seeding a cloud cell thus comprises means for conveying 12 an active substance and means for delivering 13 said active substance. The means for conveying 12 an active substance consist mainly of a container, that is to say any element, object or physical entity making it possible to accommodate or receive said active substance, guaranteeing in the end the transport and/or conveyance of the active substance to a predetermined ideal destination in order to ensure the seeding function. Such means for conveying 12 are advantageously sealed, and even hermetically sealed, in order to preserve the integrity of the active substance, in particular by preventing any unintended chemical reaction between the active substance and the ambient environment around said device, and to enable an optimal application of the seeding methods. The delivery of an intact active substance can thus be effectively conveyed to a predetermined position. We shall see in the rest of the document that different elements of a device for seeding according to the invention contribute to the effective conveying of such an active substance to a predetermined position. Such elements can consist more particularly of the aerostatic means, optionally in the form of a balloon, the conveyance to a predetermined position being a consequence of the rupture of said balloon. To achieve this, the material that mainly constitutes the means for conveying 12, as a result of its composition and/or its physicochemical properties, can advantageously ensure the sealing, even the hermetic sealing, of said means for conveying 12. As a non-limiting example, according to a first embodiment according to FIG. 3A, such means for conveying 12 can comprise a nacelle, that is to say, in the sense of the invention, a basket or a streamlined shell, optionally closed and even sealed.

In order to ensure the discharging of the active substance within the cloud cell, in addition to the means for conveying 12, a device 10 for seeding a cloud cell according to the invention includes means for delivering 13 the active substance cooperating with said means for conveying 12 said substance. Such means for delivering 13 guarantee the propagation of the active substance at a predetermined position and/or altitude considered to be optimal. Thus, said means for delivering 13 comprise one or more elements, objects or physical entities enabling the scattering of the active substance. Moreover, the delivery of the active substance can be carried out according to different techniques. Among these different techniques, one distinguishes in particular and mainly two methods: the means for delivering 13 can ensure a gradual and optionally controlled, sudden and/or instantaneous scattering. As a non-limiting example, according to a first embodiment according to FIG. 3A, such means for delivering 13 the active substance can comprise a regulation device, such as a valve or more generally any equipment making it possible to stop or modify the flow of the active substance in the atmosphere, in particular within the cloud cell. Said means for delivering 13 can then act in the manner of a spray or aerosol. Moreover, such means for delivering 13 can also comprise a jack. As a variant, such means for delivering can comprise one or more pyrotechnic flares ensuring the scattering of the substance, whether said substance consists, as non-limiting examples, of hygroscopic salt or of silver iodide, by heating the latter. According to this last embodiment, the pyrotechnic flare(s) can advantageously consist of one or more dual-burner flares. The use of such dual-burner flares turns out to be particularly advantageous, since the burner oriented towards the aerostatic means of a device according to the invention, referred to as upper burner, becomes incandescent and is then triggered at the end of combustion, then causing the rupture of the aerostatic means, optionally in the form of a balloon.

The cooperation between the means for conveying 12 and for delivering 13 can be ensured by any element capable of ensuring the association and/or the communication between said means. According to the first embodiment, according to FIG. 3A, the cooperation between the means for conveying 12 and for delivering 13 can be ensured by a duct advantageously dimensioned for this function. The invention cannot be limited to the type of the element which guarantees the cooperation or even to the physical types of the means for conveying 12 and/or for delivering 13 the active substance.

As a variant, the means for conveying 12 and the means for delivering 13 can advantageously consist of one and the same physical entity. In particular, such an arrangement makes it possible to decrease the number of elements comprising the device 10 for seeding, the means for delivering 12 and for conveying 13 being one and the same, but also to simplify the production and/or the installation of said device 10 and, in the end, to decrease the production and/or installation costs.

In order to address the regulatory problems and safety constraints imposed as of now by the currently used solutions such as, as specified above, rockets and aircraft, a device 10 for seeding a cloud cell according to the invention moreover comprises aerostatic means. "Aerostatic means" is understood to mean any means, element, object or physical entity of which the lift in the atmosphere, more precisely the air, is due to the use of a gas that is lighter than air. For example, such a gas can advantageously but not in a limiting manner be helium. As a variant, hydrogen or hot air can optionally be used. The invention cannot be limited to the gas used within the aerostatic means. As a preferred but non-limiting example, according to the different embodiments of a device according to the invention presented in connection with FIGS. 3A to 3C and 4A to 4B, the aerostatic means can comprise one or more balloons 11. The envelope of such balloons can moreover consist mainly of resilient compounds, preferably but in a non-limiting manner polymers, such as, for example, rubber, latex, neoprene, chloroprene or polyethylene. The aerostatic means 11 can moreover advantageously be sealed after introduction of the gas within said aerostatic means by any suitable closing means.

Moreover, such aerostatic means, in particular due to their dimensions, nature and physicochemical properties, have to be arranged to allow the conveying of the active substance to the environs of the cloud cell and subsequently to guarantee the seeding of the latter. More particularly, such aerostatic means, possibly in the form of one or more balloons, are advantageously arranged in such a manner that the rupture of said balloon(s), in combination with optional triggering means, is brought about when the balloon(s) reach(es) the altitude of said cloud cell. To achieve this, said aerostatic means 11 advantageously cooperate with the means for conveying 12 said active substance. Such cooperation consists primarily of the connection or the assembly of the aerostatic means 11 with the means for conveying 12. According to a first embodiment of a device according to the invention as described in connection with FIG. 3A, such cooperation between the aerostatic means and the means for conveying can be ensured by means of a connection L which is advantageously removable or permanent, for example, by means of one or more cables.

As a variant, the means for conveying and/or the means for delivering of a device according to the invention can be included within the aerostatic means. Such an arrangement in particular makes it possible to decrease the number of elements comprising the device 10 for the seeding, to simplify the production and/or the installation of said device 10, and, in the end, to decrease the production and/or installation costs. Moreover, according to another variant, according to a second embodiment of a device according to the invention described in connection with FIGS. 3B and 3C, the means for delivering and the aerostatic means can consist of one and the same physical entity. Like the preceding variant, due to the aerostatic means 11 and the means for delivering 13 being one and the same, such a configuration makes it possible in particular to further decrease the number of elements comprising the device 10 for seeding, to simplify the production and/or the installation of said device 10 and, in the end, to decrease the production and/or installation costs. According to the second embodiment described in connection with FIG. 3B, preferably but in a non-limiting manner, the aerostatic means 11 and the means for delivering 13 of a device 10 according to the invention can consist of a balloon. According to this particularly clever arrangement, the means for conveying 12 at the same time constitute the aerostatic means 11 and comprise the balloon. In fact, the balloon can comprise in its interior the active substance AS represented in FIGS. 3B, 4A and 4C. The delivery of the active substance AS is then carried out or triggered by the rupture of said balloon, said rupture being brought about when said balloon substantially reaches a predetermined altitude.

FIG. 3C in particular presents a mode of operation of the second embodiment of a device for seeding a cloud cell. In this instance, the aerostatic means, the means for conveying 12 and the means for delivering 13 consist of one and the same entity, in the advantageous but non-limiting form of a balloon 11. As specified above, such a balloon can advantageously be filled with a gas that is lighter than air, such as helium as a non-limiting example. Moreover, said balloon can consist mainly of a resilient compound, possibly a polymer, such as latex or chloroprene as a non-limiting example. As a variant or additionally, such a balloon can consist of a biodegradable material such as, for example, paper. Moreover, the balloon can advantageously be loaded with active substance AS (loading not represented in the figures), and then sealed by any suitable closing means. Once the balloon has been loaded with air and active substance and then sealed, the balloon is released into the atmosphere in order to reach its target, in this case a cloud cell. Due to the presence of the gas that is lighter than air, the balloon can advantageously rise in the atmosphere as a consequence of buoyancy in a substantially vertical direction (substantially normal with respect to a reference system such as the earth's surface or the horizon line). Near the base of the atmosphere, the pressure of the air outside the balloon is substantially equal to the pressure of the gas inside the balloon. In addition, the collisions between the molecules comprising the air and the gas outside and inside of the balloon, respectively, are substantially equal, allowing the balloon to remain in a stable configuration. When the balloon rises in the atmosphere and its altitude increases, the presence of air molecules decreases due to a decrease in the pressure. Here, the balloon being sealed, the quantity of gas molecules remains constant within the balloon. The collisions of the gas molecules within the balloon being greater, the balloon continues to inflate. Here, the material constituting the balloon, although advantageously resilient, that is to say capable of recovering its original shape after having been deformed, has an elastic limit. The "elastic limit" is defined as the stress, that is to say all the forces applied to the material constituting the balloon which tend to deform the balloon, starting from which the material constituting the balloon is irreversibly deformed up to possible rupture of said material. The balloon then undergoes a plastic deformation until a crack is obtained on the surface of a balloon, as represented in FIG. 3C. Due to the presence of a strong tension on the surface of the material, said crack, subsequently when it has reached its limit speed, multiplies into several fractures and propagates over the entire surface of the balloon. Finally the balloon 11, more particularly the material composing it, will break into a plurality of pieces and, in the end, enable the delivery of the active substance AS, advantageously within the cloud cell. Once the active substance AS has been scatter within the cloud cell, as in the known seeding methods, the water droplets (not represented in FIG. 3C) agglomerate around the active substance, resulting in the increase in the condensation of water vapor into liquid water available in a cloud cell and thus increasing or decreasing the size and the number of droplets present within said cloud cell and, in the end, causing rain precipitation P.

Consequently, various criteria can make it possible to control the delivery of the active substance and the seeding of a cloud cell, such as, for example, the rupture of the aerostatic means in the form of a balloon. First, the material which mainly constitutes the balloon has an intrinsic elastic limit. Thus, depending on the material selected, in particular its composition or its dimensions, in order to form the balloon and more generally the device for seeding, depending on the desired application, it is possible to substantially control the triggering of the delivery of the active substance by substantially "programming" the altitude at which the balloon will burst. As a variant or additionally, by decreasing or increasing the quantity of gas present within the cloud cell and/or by changing the composition of the gas, it is also possible to regulate, that is to say to accelerate or delay, the rupture of the balloon or more generally of the device and finally the scattering of the active substance.

Moreover, a device for seeding a cloud cell according to the invention can comprise an active substance AS, said substance being included within the means for conveying said active substance. Such an arrangement in particular guarantees an all-in-one device, which is ready to be used by a beginner or experienced user. As specified above, said active substance AS preferably must have a strong affinity for water. Depending on the application and/or the structure of the device for seeding a cloud cell, said active substance AS can be in different forms, generally solid forms, such as crystals of different sizes or powders, as non-limiting examples. The use of an active substance AS in the form of powders turns out to be particularly advantageous, since its delivery, dispersion and/or scattering are easier to control and/or regulate regardless of whether the delivery of the active substance occurs suddenly or gradually.

In general, said active substance AS can advantageously but in a non-limiting manner consist of ice nuclei such as silver iodide or copper iodide. Preferably, the active substance AS of a device according to the invention can consist primarily of silver iodide. The use of silver iodide is particularly advantageous and consequently preferred, since it is the most effective particle at −5° C. in small quantities. However, silver iodide in many cases turns out to be toxic and not ecological. As a variant or additionally, the active substance of a device according to the invention can consist primarily of hygroscopic salts. In fact, depending on the desired application, due to the strong toxicity imposed by the silver iodide, other researchers recommend the use of hygroscopic salts, for example, in the form of sodium, calcium or magnesium salts, alginates or cooling materials such as dry ice, propane or liquid nitrogen.

Moreover, regardless of the configuration of the device 10 according to the invention, as a variant or additionally, the active substance AS of a device 10 according to the invention can be associated with propagation marker particles M which can be detected by any suitable analysis means. The presence of such marker particles M is particularly clever, since they enable a user of the device such as a farmer to observe the propagation of the active substance and thus to ascertain the effectiveness of the device for seeding a cloud cell. Such particles M can advantageously be analyzable by any suitable analysis means such as an ultraviolet spectrophotometer or an infrared spectrometer, by absorption or by fluorescence, as non-limiting examples. As a variant, it could optionally be considered that the particles M can be colored, so that they are detectable and/or observable in the visible range with the naked eye, or optionally by means of a vision magnifying optical system.

According to a particularly valued application example, such marker particles M can include particles, flakes or filaments of aluminum, plastics or microglasses which are highly radar-reflective and which are commonly used in "CHAFF" countermeasure system in particular for scrambling radar.

In order to control the delivery of an active substance AS at a chosen altitude, depending in particular on the position of the cloud cell to be seeded and on the application, the means for delivering the active substance of a device for seeding a cloud cell according to the invention can work together with triggering means arranged to cause the delivery of the active substance AS at a given position, said triggering means being included within the device 10 according to the invention. As a variant, the means for delivering the active substance can optionally comprise triggering means. Such triggering means enable a user of a device 10 according to the invention to actuate the delivery of the active substance AS at the desired time and at a predetermined position, and, in the end, to ensure a more effective seeding by guaranteeing a more precise and even optimal targeting of the cloud cell to be seeded.

Figure 4B:
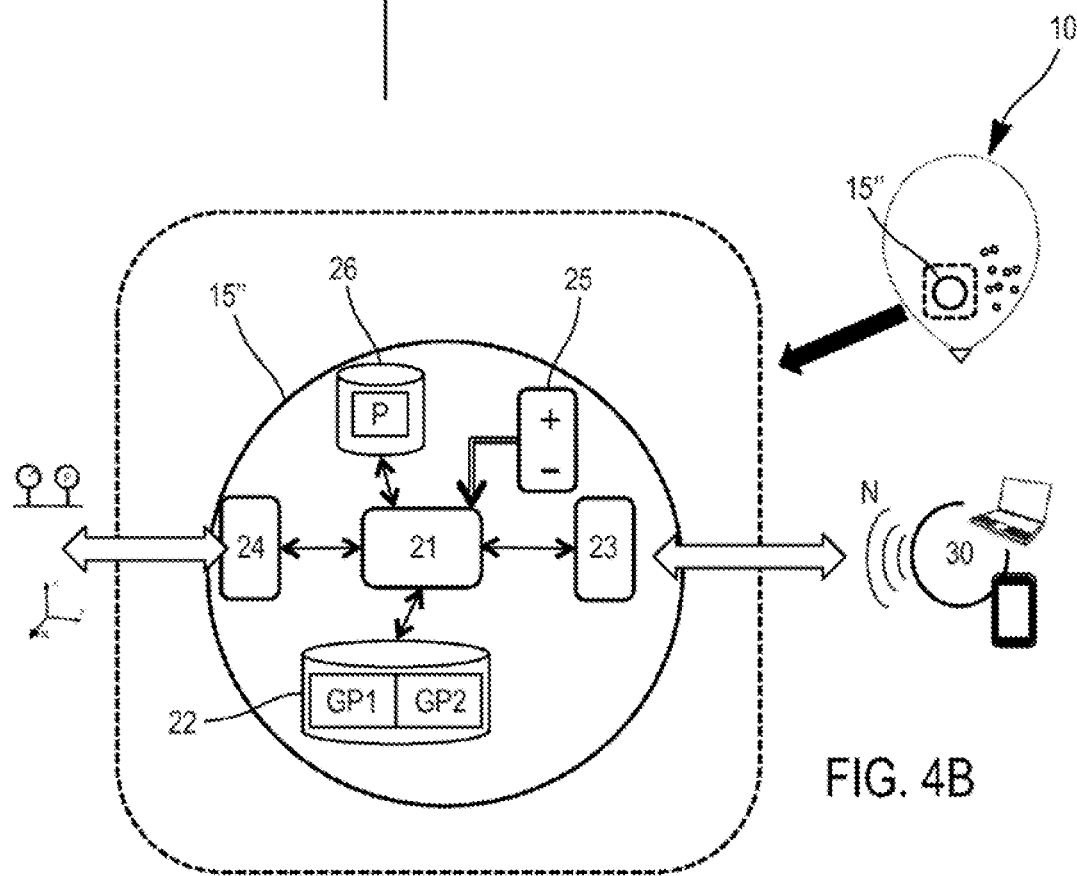

Two non-limiting examples of the triggering means of a device 10 according to the invention are described by the third and fourth embodiments in connection with FIGS. 4A and 4B, respectively.

According to a third embodiment of a device according to the invention described in connection with FIG. 4A, said device 10 for seeding a cloud cell 1 comprises aerostatic means 11 in the form of a balloon like those described above in connection with FIG. 3A, 3B or 3C. The aerostatic means 11 can also advantageously consist mainly of a resilient compound. Moreover, according to this embodiment, the means for delivering an active substance AS or marker particles M and the means for delivering active substance are advantageously the same as the aerostatic means 11. The active substance AS and optionally the marker particles M are then enclosed within the aerostatic means 11. Moreover, said device 10 includes triggering means 15' arranged for bringing about the delivery of the active substance AS at a given position, optionally defined in three dimensions according to a reference system x, y, z. According to this embodiment, such triggering means 15' comprise one or more protruding elements 15's, such as pins as non-limiting examples. Said protruding element(s) 15's can advantageously cooperate in a connected manner with a harness, said harness surrounding at least partially the aerostatic means 11. The projecting distal portion of the protruding elements 15's is advantageously in contact with the aerostatic means, in this case the balloon 11. As specified above, when the balloon rises in the atmosphere and its altitude increases, the presence of air molecules in the atmosphere decreases due to a decrease in the pressure. Here, the balloon being sealed, the quantity of gas molecules remains constant within the balloon. The collision of the gas molecules within the balloon being greater, the balloon continues to inflate. The protruding elements being in contact with the aerostatic means and the latter being possibly overinflated, the contact between the protruding elements and the aerostatic means in the end brings about the rupture of the aerostatic means and results in the delivery of the active substance AS or of marker particles M if present, advantageously within the cloud cell 1.

As a variant, according to a fourth embodiment of a device according to the invention described in connection with FIG. 4B, said device 10 for seeding a cloud cell 1 comprises aerostatic means 11 in the form of a balloon, like those described above. Said aerostatic means can advantageously consist mainly of a resilient compound. According to this embodiment, the means for conveying 12 an active substance or marker particles M, and the means for delivering 13 said active substance are advantageously one and the same as the aerostatic means 11. The active substance AS, optionally the marker particles M when the latter are present, are then enclosed within the aerostatic means 11. Moreover, said device 10 includes triggering means 15" arranged for bringing about the delivery of the active substance at a given position and/or at a given altitude. According to this embodiment, such triggering means 15" consist of an electronic object. Such an electronic object comprises a first processing unit 21 in the form of a microcontroller or a microprocessor, for example. Moreover, the electronic object comprises one or more measurement sensors 24 working together with said first processing unit 21 and delivering to said processing unit a measurement of a first physical quantity GP1 which is representative of the pressure within the aerostatic means 11. Such a sensor 24 can measure said absolute or relative pressure within the aerostatic means or a pressure differential between the outside environment in the vicinity of said aerostatic means 11 and the interior of the latter. As non-limiting examples, such a sensor 24 can consist of one or more manometers, piezometers or barometers. As a variant or additionally, such a sensor can deliver a measurement of a first quantity GP1 regarding the temperature and/or humidity level within the aerostatic means and/or in an environment close to said aerostatic means. Said first processing unit 21 is arranged for comparing the physical quantity measurement with a predetermined threshold. For this purpose, the electronic object comprises a data memory 22 which together works with said first processing unit 21 by means of internal communication buses represented by single-line double arrows in FIG. 4B. Before launching the device according to the invention, said predetermined threshold can optionally be recorded within the data memory 22. When said measurement reaches said threshold, the first processing unit 21 is arranged for generating an actuation command intended for the means for delivering 13 the active substance AS, requesting the controlled triggering of the delivery of the active substance AS. To achieve this, the means for delivering 13 have electrical controls and are suitable for interpreting an actuation command generated by the triggering means 15".

Moreover, for the electronic object to be able to operate completely autonomously, said electronic object can advantageously comprise an electric power source 25 in the form of one or more batteries, for example, or in the form of photovoltaic cells positioned on the device 10, of a wind power source or of one or more precharged capacitors capable of delivering sufficient electric power to enable the operation of the electronic object. The ability to operate of an electronic object is directly connected with the remaining available energy capacity of said electronic object.

Moreover, as a variant or additionally, in order to enable a better traceability of the seeding of such a cloud cell, a device 10 for the seeding of such a cloud cell according to the invention can moreover comprise means for tracking 15''' (not represented in FIG. 4B) the trajectory and/or position of said device, said tracking means working together with the aerostatic means of said device 10. To achieve this, said tracking means, consisting advantageously of a second electronic object, comprise:

- a processing unit;
- a second sensor for measuring and collecting a physical quantity regarding the trajectory and/or the position of the device, working together with said processing unit;
- a data memory working together with said second processing unit in which said processing unit records the quantity measured and collected according to a given periodicity.

A non-limiting example of such tracking means is described in connection with FIG. 4B, which represents the fourth embodiment. According to this example, the first and second processing units advantageously consist of one and the same physical entity 21. In the end, said tracking means 15''' and the triggering means 15" of a device 10 according to the invention can thus be one and the same and consist of a single physical system. However, said first and second processing units can optionally be separate processing units. Moreover, like the first and second processing units, said triggering means 15" and said tracking means 15''' can optionally be separate means.

As described above, such tracking and/or triggering means comprise a processing unit 21 in the form of a microcontroller or microprocessor, for example. Said electronic object also comprises a data memory 22, optionally a program memory 26, said memories being optionally separate memories. The processing unit 21 works together with said memories 22 and 26 by means of internal communication buses represented by single-line double arrows in FIG. 2.

The electronic object also comprises one or more measurement sensors 24 working together with said processing unit 21, said sensor(s) being arranged for measuring and collecting a second physical quantity GP2 regarding the trajectory and/or the position of the device 10 at a given time or according to a given periodicity. Such a sensor 24 can measure and collect the acceleration, the position or the angular speed of a device 10 according to the invention during its movement in the atmosphere. To achieve this, the sensor(s) 24 can consist of an accelerometer and/or a gyroscope, said accelerometer and/or gyroscope advantageously working together with the aerostatic means 11 according to a suitable mechanical connection. As a variant or in addition to the accelerometer and/or the gyroscope, the sensor(s) 24 can include an inertial unit generally comprising three gyrometers and three accelerometers, or a GPS ("Global Positioning System" in English terminology) geolocation system, said unit and/or said system advantageously working together with the aerostatic means.

Regardless of the type of second physical quantity GP2 measured and collected, a digital representation thereof is in the end recorded by the processing unit 21 within the data memory 22 according to a predetermined periodicity. Such a periodicity can be pre-defined before the launching of the device 10, automatically or manually. As non-limiting examples, such a periodicity can be on the order of one second or several tens of seconds.

Optionally, the sensor(s) 24 of the tracking means of a device 10 according to the invention can also be capable of detecting propagation marker particles M according to a suitable analysis means. Such sensors 24 can optionally be based on detections by microwaves, by conductivity probes, by vibrating plates or based on optical and chemical detections, as non-limiting examples. Moreover, as specified above, such marker particles M can advantageously be traced by any suitable analysis means such as an ultraviolet spectrophotometer or an infrared spectrometer, by absorption or by fluorescence, as non-limiting examples. As a variant or additionally, a device for seeding a cloud cell according to the invention can comprise or cooperate with one or more radar reflectors in order to track the trajectory of said device.

Moreover, as specified above, for the electronic object to be able to function completely autonomously, the latter advantageously comprises an electric power source 25, in the form of one or more batteries, for example. The ability to operate of an electronic object is directly connected with the available remaining energy capacity of said electronic object.

As described previously, for purposes of effectiveness, the tracking of the position and/or of the trajectory of a device 10 according to the invention can advantageously be ensured by means of recordings, recorded by the processing unit 21 within the data memory 22, of digital representations of the second physical quantity GP2 regarding the trajectory and/or the position of said device 10, measured and collected according to a given periodicity. Once the seeding has been completed, said measurements are collected and transferred.

As a variant, it is possible to provide that the device 10 can communicate and/or transmit a representation of the physical quantity(ies) GP1, GP2 measured and collected in real time. To achieve this, the electronic object embodying the triggering means 15" and/or the tracking means 15''' can comprise communication means 23 working together with the processing unit 21, also by means of internal communication buses. Said communication means 23 can thus ensure a communication N, optionally by wire or wirelessly, intended for any remote electronic entity 30 within communication reach. Such communication means 23 can also be of "long distance" type and enable such a device 10 to be able to transmit all or part of the content of the data memory 22 to said remote entity 30 via messages distributed by a network operating, for example, GSM, GPRS or satellite technologies, in the case in which said communication is wireless.

Additionally, in order to control the trajectory and/or the position of a device 10 for seeding a cloud cell according to the invention, said device can comprise trajectory correction means (not represented in the figures) which cooperate with the aerostatic means 11. Such optional correction means make it possible in particular to correct, attenuate and/or compensate for the optional elements and/or external conditions such as, for example, wind currents, which can potentially influence the trajectory of the device 10 and/or the propagation of the delivery of the active substance AS and, in the end, the seeding of the selected cloud cell. As non-limiting examples, such correction means can consist of one or more propulsive units with electrical controls working together with the first processing unit 21. Said propelling unit(s) can cause a substantially horizontal movement or a substantially vertical movement of the device 10, depending on the stresses undergone by said device 10 or the cloud cell to be seeded. Such propulsive units can thus consist of one or more propellers or turbines. The different propulsive units cooperate with the processing unit 21 which translates one or more instructions, recorded in the data memory 22 and/or transmitted, into propulsion commands conveyed by wire, that is to say by an electric bus, or wirelessly from the processing unit 21 to the propulsive unit in question. Any means, element or device equivalent to a propulsive unit can be used. The invention cannot be limited to the correction means used. Such an instruction can optionally be elaborated from a remote entity 30 working together with the device 10 or, as a variant, can be elaborated by the processing unit 21 in response to a discrepancy detected between a predetermined target trajectory, optionally using GPS coordinates, before the launching of the device, and the current trajectory calculated by said processing unit via the digital representations of the physical quantity GP2 measured and collected by the sensor(s) 24.

According to a second subject matter, the invention also provides a system for seeding a cloud cell. Such a system according to the invention advantageously comprises a device 10 for seeding a cloud cell according to the first subject matter of the invention. In order to ensure a better effectiveness of the seeding by means of an optimized traceability, said system according to the invention moreover includes a remote electronic entity 30 capable of communicating with said device 10 via the communication means 23 present within the device 10. Such an electronic entity 30 is advantageously capable of receiving and decoding any measurement regarding the second physical quantity GP2 transmitted by a device 10 for seeding a cloud cell according to the invention via the communication means of said device. As non-limiting examples, said remote electronic entity 30 can advantageously consist of a computer, a smartphone, a tablet or any other electronic equipment or object arranged for communicating with the triggering means 15" and/or tracking means 15''' of a device 10 according to the invention.

Moreover, as a variant or additionally, the electronic entity 30 of a system for seeding a cloud cell according to the invention can be arranged for reading the content of the data memory of said device 10. For this purpose, the data memory 22 of a device 10 according to the invention can physically correspond to one or more removable memory cards, for example, of the SD type ("Secure Digital" in English terminology). According to this arrangement, the electronic entity 30 is then arranged for reading and accessing the content of said memory card. Such an arrangement can result from loading an appropriate computer program product in a program memory of said electronic unit 30.

Moreover, the processing unit 21 of the triggering means 15" and/or of the tracking means 15''' of a device 10 according to the invention can be arranged for producing one or more actuation and/or propulsion commands based on the loading in the data memory 22, or in a program memory 26 which may be separate from the data memory, of a computer program product comprising one or more program instructions which, when executed or interpreted by said processing unit, cause the implementation of appropriate procedures.

Additionally, the system for seeding a cloud cell according to the invention can include a station (not represented in the figures) for preparation and/or launching of a device 10 for seeding a cloud cell according to the invention, said station advantageously but in a non-limiting manner comprising equipment or equivalent means for:

determining and/or injecting the quantity and/or pressure of gas within the aerostatic means 11, more particularly within the envelope of a balloon, in order to fill the aerostatic means 11;

integrating and/or loading an active substance AS and/or marker particles M within the means for conveying 12;

launching or releasing a device 10 for seeding a cloud cell according to the invention;

initializing and/or parameterizing the data memory 22 and/or program memory 26 of the triggering means 15", tracking means 15''' and/or trajectory correction means of a device according to the invention.

Such an initialization and/or such a parameterization can advantageously be carried out by wire or wirelessly, advantageously by coupling by means of RFID ("Radio-frequency identification" in English terminology) communication protocols or BT ("Bluetooth" in English terminology) communication protocols.

Moreover, when the aerostatic means include a balloon, depending on the material used to form the envelope of said balloon, the rate of the filling of said balloon with gas should advantageously be controlled and relatively slow, on the order of about thirty minutes. In fact, the mechanical stresses imposed by the balloon, more particularly the material constituting said balloon, can result in certain negative consequences during the stretching of said material, in particular by the application of an excessively rapid stretching rate. Thus, if the gas is injected too quickly within the aerostatic means, in this case a balloon, cracks, fractures and/or streaks can appear on the envelope of said balloon, all constituting sources of alteration and even rupture. In addition, during the injection of the gas, the use of a pressure releasing or regulating device, that is to say any equipment arranged for enabling the passage of the gas from a reservoir towards the balloon, induces low temperatures, close to zero degrees Celsius, and, in the end, a rigidification of certain portions of the material comprising the balloon, said rigidification thus potentially resulting in one or more ruptures of the envelope of the balloon, and then causing a possible delivery of the active substance AS at an inappropriate and/or undetermined altitude or position.

To prevent these alterations, a station of a system for seeding a cloud cell according to the invention can advantageously include means for regulating the pressure and/or the temperature of the gas during its injection within the aerostatic means. As non-limiting examples, such means for regulating can comprise a two-stage pressure reducing device including two reservoirs at two different pressures, for example, respectively, a first reservoir at a hundred bars and then a second reservoir at five bars. As a variant, such means for regulating can include or cooperate with a pressure reducing device comprising a heat exchanger. Such an exchanger can optionally consist of a heat exchanger with copper coil(s), in such a manner that the temperature of the gas during its injection into the aerostatic means does not alter the said means. Said exchanger can advantageously be passive or active. As a variant, when the aerostatic means in the form of a balloon have fixed dimensions, that is to say when it comprises an advantageously non-resilient envelope, the means for regulating the pressure and/or the temperature can comprise a double-wall injector, making it possible to avoid any contact between the envelope of a balloon and the injector.

The invention has been described in its use in connection with cloud cell seeding applications, in particular for the prevention of hail. It can also be used to act on any type of meteorological phenomena such as fog suppression, increasing precipitation in the form of rain, attenuation of tropical cyclones, protection from lightning or freeze control, as non-limiting examples. As a variant, the invention can also be used for increasing the precipitation of snow, for example, in ski resorts, or for storing water in winter in the form of snow.

It could also be considered that the device according to the invention ensures functions and/or applications other than those described and/or mentioned above, such as decontamination or depollution of the water present within the cloud cells or the reduction of the acidity of said water, as non-limiting examples. The invention cannot be limited to the application within which the device according to the invention is used.

A device according to the invention can also comprise several active substances AS and/or means for conveying and/or scattering said active substance(s) AS, for acting in different zones of the cloud cell in accordance with one or more predetermined temperatures and/or altitudes by using one or more suitable active substances. Such scattering in different stages makes it possible in particular to limit the triggering of the scattering of one or more active substances in zones of low interest.

Other modifications can be considered without leaving the scope of the present invention defined by the appended claims.

The invention claimed is:

1. A device for seeding a cloud cell, comprising means for conveying and delivering an active substance, said device moreover comprising aerostatic means including a balloon and working together with the means for conveying said active substance, wherein said device is arranged in such a manner that:
   a delivery of the active substance is triggered at a first predetermined altitude, and
   an apparatus for causing said balloon to rupture when said balloon substantially reaches a second predetermined altitude, the second predetermined altitude being different than the first predetermined altitude.

2. The device according to claim 1, wherein the means for conveying and for delivering comprise means for conveying an active substance and means for delivering said active substance.

3. The device according to claim 1, wherein the means for conveying and delivering comprise a single physical entity.

4. The device according to claim 1, wherein the means for conveying comprises said active substance.

5. The device according to claim 4, wherein the active substance comprises primarily silver iodide or hygroscopic salt.

6. The device according to claim 4, wherein the means for conveying also comprises propagation marker particles which can be detected by any suitable analysis means.

7. The device according to claim 1, wherein the means for delivering comprise or cooperate with triggering means configured to cause the delivery of the active substance at a given position.

8. The device according to claim 7, wherein the triggering means comprise one or more protruding elements whose distal portion is in contact with the aerostatic means.

9. The device according to claim 7, wherein the triggering means comprise:
   a first processing unit;
   a first sensor working together with said first processing unit and delivering to said first processing unit a measurement of a first physical quantity which is representative of the pressure within the aerostatic means;
   said first processing unit being configured to compare the measurement of the first physical quantity with a predetermined threshold and, when said measurement reaches said threshold, for generating an actuation command intended for the means for delivering the active substance;
   and the means for delivering have electrical controls and are suitable for interpreting the commands generated by the triggering means.

10. The device according to claim 1, moreover comprising means for tracking the trajectory and/or the position of said device, said tracking means working together with the aerostatic means and comprising:
    a second processing unit;
    a second sensor for measuring and collecting a second physical quantity regarding the trajectory and/or the position of the device, working together with said second processing unit;
    a data memory working together with said second processing unit in which said second processing unit records the second quantity measured and collected according to a given periodicity.

11. The device according to claim 9, moreover comprising means for tracking the trajectory and/or the position of said device, said tracking means working together with the aerostatic means and comprising:
    a second sensor for measuring and collecting a second physical quantity regarding the trajectory and/or the position of the device, working together with the first processing unit;
    a data memory working together with said first processing unit in which said first processing unit records the second quantity measured and collected according to a given periodicity.

12. The device according to claim 10, wherein the means for conveying comprises propagation marker particles which can be detected by any suitable analysis means, and the second sensor is capable of detecting the propagation marker particles according to a suitable analysis means.

13. The device according to claim 10, wherein the second sensor comprises an accelerometer and/or a gyroscope.

14. The device according to claim 10, wherein the tracking means comprise communication means working together with the second processing unit, said communication means being arranged for transmitting all or part of the content of the data memory to a remote electronic entity.

15. A system for seeding a cloud cell, comprising a device for the seeding according to claim 14 and the remote electronic entity capable of communicating with said device via the communication means by wire or wireless connection.

16. The system according to claim 15, wherein the electronic entity is configured to read the content of the memory of the tracking means of said device.

* * * * *